Patented July 16, 1935

2,007,958

UNITED STATES PATENT OFFICE 2,007,958

MANUFACTURE OF MODIFIED, BODIED PRODUCTS FROM FATTY OILS AND THE LIKE

László Aúer, Budapest, Hungary, assignor to J. Randolph Newman, Washington, D. C., as trustee No Drawing. Application April 30, 1929, Serial No. 359,424. Renewed September 29, 1934. In Great Britain May 4, 1928

26 Claims. (Cl. 106—23)

This invention relates to the manufacture of rubber-like materials from fatty oils.

In the processes here described, raw fatty oils are first thickened and bodied to a substantial degree in a controlled manner. These thickened bodied oil products are obtainable by heating the raw fatty oil to temperatures sufficient to polymerize the said fatty oil and continuing the heating at said temperatures until the desired body is obtained. Then the thickened heat-bodied oil products of the desired body are emulsified in an aqueous medium, preferably an alkaline aqueous medium. The suspended particles of said bodied oil products are maintained in the emulsified state until upon separating the water from said emulsions there is obtained a rubber-like material having physical properties similar to rubber, those physical properties being indicative of an internal structure similar to rubber. And then the water is removed from said emulsion to recover said rubber-like materials.

In certain of my copending applications, I have described various specific methods for producing thickened bodied oil products physically similar to polymerized or heat-bodied oils. In those processes, the thickening or bodying is effected in the presence of and with the aid of metal salts and other electrolytes (polar compounds). The natural fatty oils are mixed with the metal salts, etc. and the mixture heated to polymerizing temperatures. In the presence of the metal salts, etc. thickening or bodying can be obtained at somewhat lower temperatures and in a shorter time. The thickened bodied oils obtained with the aid of metal salts, etc. have a lighter color and other advantages over the ordinary heat bodied oils. In my prior processes, temperatures between 200 and 300° C. are used, preferably above 250° C. By the various specific methods disclosed in my said prior copending applications, heat bodied oils of varying consistency (body) may be obtained. By those processes I can control the thickening of the fatty oils and the body of the products obtained. The thickened heat-bodied oils so produced contain a small amount of polar compounds (an electrolyte such as metal salt, etc.) dispersed in the bodied oil product. The presence of such polar compounds in the bodied oil product has an important influence when those bodied oil products are used in the present invention.

In fact, my present processes are improvements upon my prior processes. By emulsifying my prior products in an aqueous medium and maintaining the suspended particles in an emulsified state in the water, under suitable conditions and for a sufficient time, there is obtained, by removing the water from the emulsion, a rubber-like material quite different from the original heated bodied oil used. This is a quite surprising and unexpected change to obtain by mere emulsification in water. However, the evidence of the change is unmistakable. In many cases it is remarkable. The rubber-like materials thus obtained from my said emulsions by removing the water, that is, the liquid medium of the emulsion, are physically similar to rubber; they having physical properties similar to ordinary rubbers, these properties being indicative of an internal structure analogous to that advanced for rubber-like materials.

In my co-pending application Ser. No. 143,786 and several other applications I have disclosed that certain organic isocolloids, especially such as contain unsaturated carbon compounds e. g. heavy mineral oil fractions containing naphthenic acids, fatty oils, resins, asphalts, goudrons, litches, bituminous oils, waxes, rubber, rubber-like hydrocarbons, styrene, etc., undergo a modification or colloidal transformation when treated with modifying agents which comprise various electrolytes, gases, metals, metal hydroxides, etc. by which for example, liquid oils become solid or viscous, and solids are converted into viscous or thin liquids.

This colloidal transformation appears to be independent of any radical chemical change in these substances, and seems to be primarily a physical change. In many instances the physical properties of these substances are greatly changed without any apparent change in the general chemical character. However, in some instances, a chemical change may occur simultaneously but this may be considered secondary.

Agents which produce such a colloidal transformation are herein referred to as modifying agents.

In my copending application Ser. No. 143,786, I have described processes wherein metal salts are mixed with fatty oils, particularly drying oils such as linseed oil, and the mixture heated to between 200° to 350° C. under vacuum until a thickened, bodied oil product is obtained. The said oil product contains a small amount of a metal salt dispersed therein. By heating under vacuum, excess of air and consequently oxidation is prevented. Some of the thickened, bodied oil products produced by those methods are specifically used in the present processes.

I have now found that further modification or transformation of the colloidal state of the bodies thus treated can be effected by afterwards subjecting them to emulsification in an aqueous medium. That is to say, it is found, if the aqueous medium is subsequently removed that the body is no longer in the same physical or colloidal state as it was before emulsification.

The present invention therefore comprises a process of colloidal transformation of isocolloid substances containing unsaturated carbon compounds to modify the viscosity and other physical properties of the substance wherein the substance is first subjected to treatment with modifying agents of the kind described and thereafter further transformation is effected by emulsification or dispersion in an aqueous medium with the aid of emulsifying or dispersing agents and/or protective colloids if desired.

The emulsification may be carried out with the aid of the usual emulsifying agents with or without protective colloids.

In some cases the treatment with a modifying agent can be effected while emulsification is still proceeding. In other cases the treatment with a modifying agent may follow emulsification.

Further, I have found that the modifying process commenced by the action of electrolytes etc. in the original starting-material may be continued and completed in the emulsion of the modified or partly modified material during the act of emulsification and/or subsequent treatment of the emulsion with reagents and/or allowing the emulsion to stand at ordinary or increased temperature at reduced or ordinary or increased pressure while being stirred or not. That is to say, if one of the organic substances included in the above description is first subjected to a modifying treatment with electrolytes etc., e. g. as described in my application Ser. No. 143,786 and then emulsified, e. g. with water in the presence of suitable emulsifying agents, etc., the process of modification may in many cases continue during and after emulsification: an oil, for example, which has been thickened by a modifying treatment with a water insoluble modifying agent, becomes thicker and less sticky and eventually solid when emulsified, and this continuation of the modifying process can be assisted or varied by a suitable treatment of the emulsion.

The invention therefore further contemplates that the emulsion or dispersion may be treated with modifying agents of the kind described for the purpose of effecting further transformation of state of the substance.

My invention comprises processes involving as a step thereof effecting partial or complete modification of isocolloid substances while it is maintained in an emulsified state in an aqueous medium. When modification is so effected, the modified products obtained are advantageously affected. As is well known, most products obtained from the isocolloid substances in question by prior processes, are tacky or have a tendency to become tacky. I have found that products obtained by effecting all or part of the modification while the isocolloid substance is emulsified in an aqueous medium, are free or nearly free from tackiness.

Various modifications are possible within the scope of my generic invention. For instance, an isocolloid substance may be first partially modified by processes disclosed in my acknowledged copending application and then the product emulsified in an aqueous medium, the emulsified state being maintained until the partial modification initiated in the prior treatment is brought to completion.

In another alternative method substantially the same procedure is followed but completion of modification, or a further modification, is accomplished by means of a second modifying agent; this second modifying agent being either originally present in the aqueous medium in which the isocolloid substance is emulsified or being subsequently added to the emulsion. Or, all of the modification can be effected while the isocolloid is in an emulsified state. In so doing the isocolloid is first emulsified and then the modifying agent or agents are added to the emulsion. One, or all, of the modifying agents may be components of the aqueous medium used in emulsifying. Or, one or more of these substances may be added to the emulsion after formation. The exact details may be varied to obtain the best results with any particular given substance. In all cases, however, the isocolloid substance is emulsified in an aqueous medium and so maintained until the desired modification is obtained.

Conversion of an isocolloid into an aqueous emulsion is a characteristic feature of the present invention. I have found that the modified isocolloid bodies subsequently isolated by removal of the aqueous medium are different from the isocolloid substance before emulsification.

My invention is applicable not only to the modified products of my co-pending application Ser. No. 143,786 but also to products obtainable by treatment of the modifiable substances with metals, metal oxides or metal hydroxides, or with certain inorganic derivatives of organic compounds as detailed in my co-pending application Ser. No. 273,159 or with gases or other modifying agents generally, or with mixtures of these agents.

It is not possible to enumerate completely all the substances which have been found in particular cases to act as modifying agents. Such substances include compounds comprising within the molecule an acidic inorganic residue and an organic residue. By an acidic inorganic residue I mean such an inorganic residue as can be converted by the addition of one or more hydrogen atoms into an inorganic acid including carbonic acid as inorganic. It will be seen that this definition includes such compounds as organic halogen derivatives, e. g. trichloracetic acid, chloral hydrate, iodoform, organic sulphonic acids, and their halides and esters, e. g. benzenesulphonic acid, p-toluenesulphonyl chloride, beta-naphtol 3:6:8 trisulphonic acid, methyl p-toluene sulphonate, esters of inorganic acids, e. g. dimethyl sulphate, tricresyl phosphate, nitrocresol carbonate, and inorganic salts of organic bases, e. g. meta nitraniline hydrochloride, diamino diphenyl amine sulphate, as detailed in my co-pending application Ser. No. 359,425.

In my copending application Ser. No. 359,425, I have disclosed further processes of making the thickened, heat-bodied oil products here used. The processes there disclosed are generally similar to those of Ser. No. 143,786. In the processes of Ser. No. 359,425, I may use organic polar compounds and other electrolytes in lieu of the metal salts used in my earlier application, Ser. No. 143,786. Also in the later filed application I may use temperatures between 250° and 300° C. and an amount of polar compound or electrolyte varying between 2 to 10 per cent by weight of fatty oil. The modified oil products (solidified oils) described in Ser. No. 359,425 may be advantageously used in the present processes. Some of them are specifically used in the present examples.

For the emulsification of the modified or partly modified isocolloids I employ the usual emulsifying agents such as soaps, sulphonated oils and their salts, sulphonated alkylated aromatic hydrocarbons and their salts, albumen, saponin, phenols and their metal compounds, and the like. The addition of protective colloids casein, glue and the like is often advantageous in stabilizing the emulsions. The modified organic isocolloid either alone or in solution in an organic medium, is agitated with the aqueous or other liquid medium, such as, for instance, an oil emulsion in water, or an aqueous glycerol solution, or an aqueous solution such as starch solution in the usual manner in the presence of the emulsifying agent etc., with or without the application of heat, until the desired dispersion is obtained. It may be advantageous to disperse the emulsifying agent in the starting material before treatment with the emulsifying medium or to produce the emulsifying agent in the mass in situ.

I have found that if the modifying treatment has been performed with the aid of a water-soluble modifying agent, the subsequent emulsification proceeds quite readily in aqueous media without the addition of emulsifying agents.

The emulsions so prepared vary, according to the nature of the starting-materials, from true emulsions liquid in liquid to suspensoid emulsions solid in liquid, and their type may be altered by the subsequent treatments now to be described.

As already stated, mere standing of the emulsions in many cases continues the process of modifying the isocolloid, and it is one of the novel features of my invention that starting with a partly modified isocolloid I obtain eventually an emulsion of the fully modified isocolloid. This modifying of the emulsified material may also be induced by acting upon the emulsion at suitable temperatures and pressures with reagents which produce this modifying effect in the non-emulsified isocolloid, namely electrolytes as defined in my co-pending application Ser. No. 143,786, and by all compounds comprising within the molecule an acidic inorganic residue and an organic residue as defined above and in my co-pending application No. 359,425, metals, metal oxides, metal hydroxides, solid and liquid acids, whether organic or inorganic, and gases whether active or inert. When gases are used e. g. oxygen, air, ozone, sulphur dioxide, hydrogen sulphide, the gas may simply be passed into the emulsion, or the emulsion may be stirred or agitated vigorously in an atmosphere of the gas. Alternatively, certain gases may be produced in situ by adding to the emulsion suitable reagents, e. g. an acid and a carbonate for carbon dioxide, an acid and a sulphite for sulphur dioxide, an acid and a peroxide or per-salt for oxygen, and so on. It is to be remarked that the action of gases is in all cases quite analogous to that of the "electrolytes" and other solid and liquid reagents above mentioned, and consists apparently in an intimate action between the complex electronic system of the reagent and the more complex electronic system of the isocolloid without forming however a chemical compound. Whilst all the reagents produce similar results, it will be understood that the products obtained vary somewhat according to the reagent used; thus an oxygen treated oil differs from one treated with sulphur dioxide, but both are harder than initial materials.

The gas treatment may be combined with a treatment with electrolytes or other liquid or solid reagents for modifying the isocolloids, or each treatment may be applied independently. Either or both may be carried out during the process of emulsification. In some cases adsorption of the gases and/or electrolytes takes place.

The treatment with solid or liquid modifying reagents is performed by adding the reagent, preferably in finely divided or colloidal form or in solution, to the emulsion. The action is facilitated by heating, and if necessary the mixture may be heated in an autoclave. Though the treatment may be carried out in a fairly coarse dispersion, it is advantageous to prevent coagulation during the treatment which might be caused by higher amounts of electrolytes or acidic gases.

As electrolytes, the following ions were used amongst others: Ammonium, potassium, sodium, lithium, iron, aluminium, calcium, strontium, barium, magnesium, zinc, tin, cadmium, lead, antimony, manganese, cobalt, nickel, copper, etc. as cations: with the ions of carbonate, tartaric acid, oxalic acid, acetic acid, formic acid, hydrochloric acid, hydrobromic acid, hydroiodic acid, sulphuric acid, sulphurous acid, hydrosulphurous acid, thiosulphuric acid, nitric acid, nitrous acid, citric acid, hydrocyanic acid, hypochlorous acid, hypoiodous acid, hypobromous acid, chloric acid, salicylic acid, naphthalenesulphonic acid, sulphanilic acid, naphthenic acid, thiocyanic acid, 1:3 naphthalenedisulphonic acid, trichloroacetic acid, monochloroacetic acid, etc. as anions.

In the definition "compounds comprising within the molecule an acidic inorganic residue and an organic residue" I mean by an "acidic inorganic residue" such an inorganic residue as can be converted by the addition of one or more hydrogen atoms into an inorganic acid (including carbonic acid as inorganic). It will be seen that this definition includes such compounds as organic halogen derivatives (e. g. trichloroacetic acid, chloral hydrate, iodoform), organic sulphonic acids and their halides and esters (e. g. benzenesulphonic acid, p-toluene-sulphonyl chloride, beta-naphthol-3:6:8-trisulphonic acid, methyl p-toluenesulphonate, benzene sulphonyl chloride, 2:5 dichlorobenzene sulphonic acid, naphthol 1:5-disulphonic acid, and paratoluene sulphonic acid), esters of inorganic acids (e. g. dimethyl-sulphate, tricresyl phosphate, nitrocresol carbonates), and inorganic salts of organic bases (e. g. m-nitroaniline hydrochloride, diaminodiphenylamine sulphate).

Furthermore the emulsion or disperson may be subjected to treatment with sulphur, sulphur chloride or other vulcanizing agents at suitable temperature, with or without the addition of accelerators (e. g. tetramethylthiuram disulphide, mercaptobenzthiazole, etc.), fillers or pigments. For this purpose finely divided sulphur, colloidal sulphur, solutions of sulphur in organic liquids or alkali sulphides (i. e. alkali polysulphides) may be added to the emulsion and the whole heated at a suitable temperature, e. g. at 120-160° C. in a closed vessel. If superaccelerators (e. g. piperidine pentamethylenedithiocarbamate, diethylammonium diethyldithiocarbamate, etc.) are added, vulcanization occurs below 100° C. In this latter case it is possible to work in open vessels also. Sulphur chloride brings about vulcanization in the cold. This is a very surprising observation, since it is generally believed that sulphur chloride is completely decomposed by water.

The vulcanization process may be performed at the same time as the other treatments above described.

Alternating treatment with sulphur dioxide and hydrogen sulphide has been found to be specially useful in certain cases, and the vulcanizing treatment which results from the formation of sulphur in situ by such alternating gas treatment may be advantageously influenced by the use of benzoquinine as an accelerator.

Filling materials, pigments and the like may be added at any stage of my process. I prefer to add them in a suitably dispersed condition at an early stage, for example before emulsification.

The emulsions obtained according to my invention, whether untreated or after undergoing any of the treatments described, are valuable in the arts for a variety of purposes. They may for example be concentrated and used for impregnation of textiles; or the disperse phase may be separated in solid form by means of the usual coagulating agents, or by drying (as, e. g. when the aqueous dispersions are used for varnishes), or it may be deposited on forms by dipping (in which case it is advantageous to cover the form with a coat containing a coagulant), or by electrophoresis; or the disperse phase may be separated from the dispersing medium by ultrafiltration. When in an electrophoretical deposition no semi-permeable supports are used the electrolytic decomposition of the water should be avoided. The emulsion may be used alone or in admixture with natural or artificial rubber latex, which may or may not have been previously vulcanized, in any or all of the above treatments, and for any of the purposes mentioned. The treatment may be profitably influenced by exposure to oscillating energy (x-rays, ultraviolet rays and the like), or by addition of non metallic organic compounds as secondary reagents.

My invention provides means for manufacturing artificial masses of great coherence which may replace with advantage those hitherto used in industry. It is illustrated but not limited by the following examples, in which the parts are parts by weight.

Example 1

To 400 parts of linseed oil which has been modified by treatment with sodium bisulphite are added as electrolyte 5.5 parts of sodium iodide, as emulsifying agent, 15 parts of ammonium oleate, as protective colloid, 3 parts of gelatine, and as emulsifying medium 800 parts of water. The whole is stirred at 80° C., and 8 parts of magnesium peroxide are added (to provide an oxygen gas treatment). After reaction is complete the product is coagulated in the usual way and dried in a stream of carbon dioxide, giving a rubber-like substance which can be milled in a rubber mill, mixed with fillers and vulcanized.

Example 2

100 parts of China-wood oil are modified with the aid of 5 parts of magnesium peroxide and 1 part of zinc carbonate at temperatures exceeding 200° C. The solidified oil is emulsified in a solution of 1 part of starch in 100 parts of water with the aid of ammonium oleate. The emulsification is carried out between 60 and 70° C. The emulsion is then allowed to stand at this temperature and it may be observed that the viscosity of the dry content of the emulsion increases with time.

Example 3

100 parts of linseed oil which have been solidified with the aid of 5 parts of para-toluene sulphonic acid at temperatures exceeding 200° C. are dissolved in 200 parts of benzene and the solution added, drop by drop, to an aqueous solution of 6 parts of a sodium soap and 2 parts of glue in 200 parts of water. During the addition the temperature is kept at 90° C., and the aqueous solution rapidly agitated until the desired emulsification is attained.

Example 4

100 parts of linseed oil are solidified with 7 parts of benzidine base at temperatures above 200° C. The solid product is melted together with 10 parts of oleic acid, the mixture well agitated and 100 parts of a 1% ammoniacal casein solution added with vigorous stirring. The ammonia and the oleic acid combine to give ammonium oleate, which when thus prepared in situ increases the emulsifying effect.

Example 5

25 parts of ammonium oleate are added to 500 parts of water at 60° C. and the solution rapidly agitated. To this solution are added 100 parts of linseed oil which has been solidified with the aid of barium peroxide and sodium sulphide, and the mixture agitated for 5 hours at 60° C. To the emulsion so obtained 10 parts of barium peroxide are added, the temperature raised to 80° C. and stirring continued until permanent flocculation occurs, water being added at intervals to make up for that lost by evaporation. The product has a consistency similar to that of rubber and after mastication on the mill fillers may be incorporated in the way usually employed in the case of rubber.

Example 6

100 parts of linseed oil which has been modified with the aid of 5 parts of sodium bisulphite are heated to 180° C. and 1 part of cobalt acetate stirred in. This product is added to a solution of 15 parts of ammonium oleate dissolved in 500 parts of water and the mixture heated to 55–60° C. To this mixture are added a further 400 parts of the modified oil product together with 4 parts of cobalt acetate, and the temperature maintained at 80–90° C. for 3½ hours with continuous stirring. 40 parts of barium peroxide and 10 parts of potassium persulphate are then added with stirring and the emulsion heated in a boiling water bath for a few days, water being added from time to time to replace that lost by evaporation. Coagulation can be brought about by the addition of a few drops of acetic acid. The product is similar to that obtained in Example 7.

Example 7

4 parts of stearic acid and 4 parts of casein are added to 300 parts of water at 70° C. and 100 parts of China wood oil which has been solidified with the aid of sodium hydrosulphite are added with vigorous stirring. To the emulsion thus formed, 7½ parts of cadmium iodide, 2 parts of peptone and 2 parts of starch are added, and the agitation continued for several hours, a current of hydrogen sulphide being bubbled through the emulsion during this time. In this instance the final product is an aggregated solid containing more sulphur than the original modified oil. Instead of hydrogen sulphide, sulphur dioxide, nitrogen, or carbon dioxide may be used in the above example. It has also been found advantageous to pass hydrogen sulphide and sulphur dioxide alternately through the well-stirred emulsion.

Example 8

100 parts of linseed oil which has been modified with the aid of sodium sulphide are heated to 120° C. and 6 parts of oleic acid added. A solution of 7 parts of sulphur in 17½ parts of sodium sulphide is then slowly added to the well stirred oil mixture. This mixture is then added to a casein solution comprising 2½ parts of casein, 6½ parts of ammonia, and 200 parts of water, and the whole rapidly agitated at 90° C. 1 part of diethylammonium diethyldithiocarbamate and 2 parts of zinc oxide are then mixed in and the agitation continued at 90° C. for 2 hours.

Example 9

100 parts of linseed oil are modified with the aid of calcium peroxide and magnesium carbonate at temperatures exceeding 200° C. The product is emulsified with 100 parts of acetone containing water, with the aid of 5 parts of sodium chlorobenzene sulphonate, 2 parts of glue and 2 parts of conc. ammonia at 60–70° C. To this emulsion is added with vigorous stirring a finely divided suspension of 10 parts of magnesium oxide in 100 parts of water and the product vigorously agitated in a slow stream of nitrogen gas until permanent coagulation occurs. The product has rubber-like properties and after mastication additional fillers may be incorporated if desired.

Example 10

The product of Example 6 may be vulcanized at room temperature by the use of 12 parts of sulphur chloride. It was observed that the sulphur chloride may act as a vulcanizing agent in the presence of water. It is, however, advantageous to allow the sulphur chloride to act on concentrated emulsions only, i. e. the quantity of water present is to be kept as small as possible. It is also advisable that the emulsion be kept alkaline with ammonia.

Example 11

50 parts of linseed oil are emulsified with 130 parts of water with the aid of 5 parts of ammonium oleate and 2 parts of stearic acid at 70° C. To this emulsion are added 2 parts of peptone, 2 parts of starch and 1 part of benzoquinone, and the mixture mechanically stirred at 70° C. in an atmosphere of hydrogen sulphide for 8 hours. 3½ parts of cadmium iodide are then added to this emulsion and the mechanical stirring then continued for several days, during which time a continuous stream of hydrogen sulphide is passed through the emulsion. The emulsion should be kept weakly alkaline by cautious addition of ammonia as required. The product is a brown, medium, viscous emulsion which can be used as such for a variety of purposes. On evaporation of the aqueous medium the residue is hard and tacky and contains sulphur.

What I claim is:

1. As an improvement in the manufacture of rubber-like materials from fatty oils, the improved process comprises mixing a minor amount of a metal salt with a fatty oil, heating the mixture to between 200° to 350° C. until said metal salt is dispersed in said fatty oil and until a thickened, heat-bodied oil product is obtained, emulsifying the said oil product in an alkaline aqueous solution, maintaining the suspended particles of said oil product in the emulsified state until upon removal of the water from said emulsion, a rubber-like material is obtained, and then removing the water and recovering a rubber-like material, having physical properties and an internal structure similar to rubber.

2. The process of claim 1, wherein the said suspended particles of said products are vulcanized while so emulsified, whereby upon subsequent removal of water the rubber-like material obtained has physical properties similar to vulcanized rubber.

3. The process of claim 1 wherein a small amount of casein is dissolved in said solution forming the liquid medium of said emulsion and the water is removed by evaporation, and wherein said casein coats the said particles of said oil product with a thin film of casein, when the water is subsequently removed as specified.

4. The process of claim 1 wherein said removal of water is effected by evaporation, thereby precipitating any dissolved matter on the inter-face of said suspended particles of said oil product.

5. The process of claim 1 wherein said metal salt is an alkali metal salt.

6. The process of claim 1 wherein said metal salt is sodium sulphide.

7. As a new and improved process of making rubber-like materials, chemically different from but physically similar to rubber, the process which comprises emulsifying in an aqueous solution, a thickened heat-bodied fatty oil product of controlled body and containing an electrolyte dispersed therein, and then while maintaining the suspended particles of said oil product in the emulsified state, vulcanizing the said particles so emulsified and then removing the water from said emulsion to recover a rubber-like material of said properties.

8. The process of claim 7 wherein a sulphur, an organic accelerator of vulcanization and a vulcanization activator suspended in said emulsion.

9. The process of claim 7 wherein an ammoniacal aqueous solution of casein containing a small amount of casein is added to the emulsion prior to vulcanization.

10. In the manufacture of rubber-like materials from fatty oils, the process which comprises forming an emulsion of a thickened heat-bodied fatty oil containing a metal salt dispersed therein, in an alkaline aqueous solution, the water of which contains dissolved therein an alkali metal sulphide, sulphur, ammonia and casein, agitating said emulsion and adding an ultra accelerator of vulcanization and an activator of vulcanization, and then further agitating the emulsion containing such additions and heating to temperatures below 100° C. until the suspended particles of said oil products are vulcanized, and then removing the water from the emulsion and recovering said rubber-like material.

11. As an improvement in the manufacture of modified, bodied oil products from fatty oils, the steps which comprise first heat-bodying the fatty oil in the presence of a modifying agent by heating a mixture of fatty oil and modifying agent to at least 200° C. until a substantially thickened, modified heat-bodied oil product is obtained, the modifying agent being used in minor amount and being a dry polar compound capable of facilitating the heat-bodying of said oil and of modifying the properties thereof, and then emulsifying the modified, heat-bodied oil product thus obtained, in an aqueous liquid to further modify the properties of the said heat-bodied oil product.

12. The process of claim 11, wherein an additional modifying agent is added to said emulsion to facilitate the further modification of the emulsified oil product.

13. The process of claim 11, wherein said emulsion is treated with a modifying gas during said further modification of the emulsified oil product.

14. In the manufacture of modified, oil products from fatty oils, the improved process which comprises heating the oil to a temperature of at least 200° C. in the presence of a metal salt and a metal peroxide until a thickened, modified oil product is obtained, and then emulsifying the oil product so obtained in an aqueous medium, adding more metal peroxide to the emulsion and stirring the emulsion until upon coagulation thereof, a solid modified oil product is obtained.

15. The process of claim 14, wherein said metal salt is an alkali metal salt and said metal peroxide is the peroxide of an alkaline earth metal.

16. In the manufacture of modified oil products from fatty oils, the steps which comprise adding an oxidizing agent to an aqueous emulsion of the fatty oil material and stirring the emulsion until upon coagulation thereof, a solid modified oil product is obtained.

17. The process of claim 10, wherein said thickened, heat-bodied fatty oil containing a metal salt dispersed therein, is a thickened, modified heat-bodied linseed oil obtained by mixing a minor amount of sodium sulphide with linseed oil and heating the mixture to between 200° and 350° C. until said metal salt is dispersed in said fatty oil and until said thickened, heat-bodied oil product is obtained, wherein said emulsion is formed by the steps which comprise heating the said thickened, heat-bodied oil product to about 120° C., adding oleic acid to the said heated oil product, stirring the heated mixture, slowly adding to this well stirred oil mixture a solution of sulphur in sodium sulphide and then adding a casein solution comprising casein, ammonia and water, the agitation being continued at 90° C. until said emulsion is obtained, and wherein said ultra accelerator of vulcanization is diethylammonium diethyldithiocarbamate and said activator of vulcanization is zinc oxide.

18. The process of claim 1, wherein said emulsification of said oil product is effected by mixing the said thickened, heat-bodied oil product in a heated condition with said alkaline aqueous solution and agitating the mixture at about 80° to 90° C. until said emulsion is formed.

19. In the process of claim 1, the steps which comprise mixing 5 parts of sodium bisulphite with 100 parts of linseed oil, heating the mixture to between 200° and 350° C. until said metal salt is dispersed in said fatty oil and until a thickened, heat-bodied oil product is obtained, emulsifying the said oil product in an alkaline aqueous solution by adding the said oil product heated to about 180° C. to an aqueous solution containing ammonium oleate, maintaining the suspended particles of said oil product in the emulsified state at temperatures between 80°–90° C. by stirring, adding barium peroxide and potassium persulphate, and continuing the stirring and heating until upon removal of the water from said emulsion, a rubber-like material is obtained, and then removing the water by coagulating the emulsion with acetic acid and recovering a rubber-like material.

20. The process of claim 11, wherein said modifying agent is an alkali metal sulphite.

21. In the process of claim 11, wherein said modifying agent is an alkali metal salt of an inorganic acid and wherein barium peroxide is added to said emulsion of the modified, heat-bodied oil product to facilitate the further modification of said oil product while maintained in the emulsified state in said aqueous liquid, the emulsion being heated and agitated after the addition of said barium peroxide until upon removal of the water, a rubber-like material is obtained.

22. In the process of claim 14, wherein said metal salt is an alkali metal sulphide and said metal peroxide, used before and after emulsification, is barium peroxide, the emulsion after the further addition of barium peroxide being agitated at about 80° C. until permanent flocculation occurs and a solid modified oil product is obtained.

23. In the process of claim 14, the steps which comprise heating linseed oil to a temperature of at least 200° C. in the presence of sodium sulphide and barium peroxide until a thickened, modified oil product is obtained, and then emulsifying the oil product so obtained in an aqueous medium by adding the said oil product to an aqueous solution containing ammonium oleate heated to about 60° C. and agitating until emulsified, adding barium peroxide to the emulsion and stirring the emulsion at about 80° C. until permanent flocculation occurs and a solid modified oil product is obtained.

24. The process of claim 1, wherein the said aqueous solution, in which said suspended particles of said oil product are maintained in the emulsified state, contains ammonium oleate and a reactive modifying agent for further modifying the said oil product and wherein such emulsion is further heated to at least 80° C. and stirred while the said oil particles are maintained in the said emulsified state, until a rubber-like oil product is obtained upon removal of the water.

25. The process of claim 1, wherein said metal salt is an alkali metal salt and is employed in the ratio of 2 to 10 parts of salt to 100 parts of said oil, the said parts being parts by weight.

26. The process of claim 11, wherein said modifying agent is employed in the ratio of 2 to 10 parts of said agent to 100 parts of said oil, the said parts being parts by weight, and wherein the time and temperature of heating the said mixture of oil and modifying agent is sufficient to produce solidifiable oil products.

LÁSZLÓ AÚER.